UNITED STATES PATENT OFFICE.

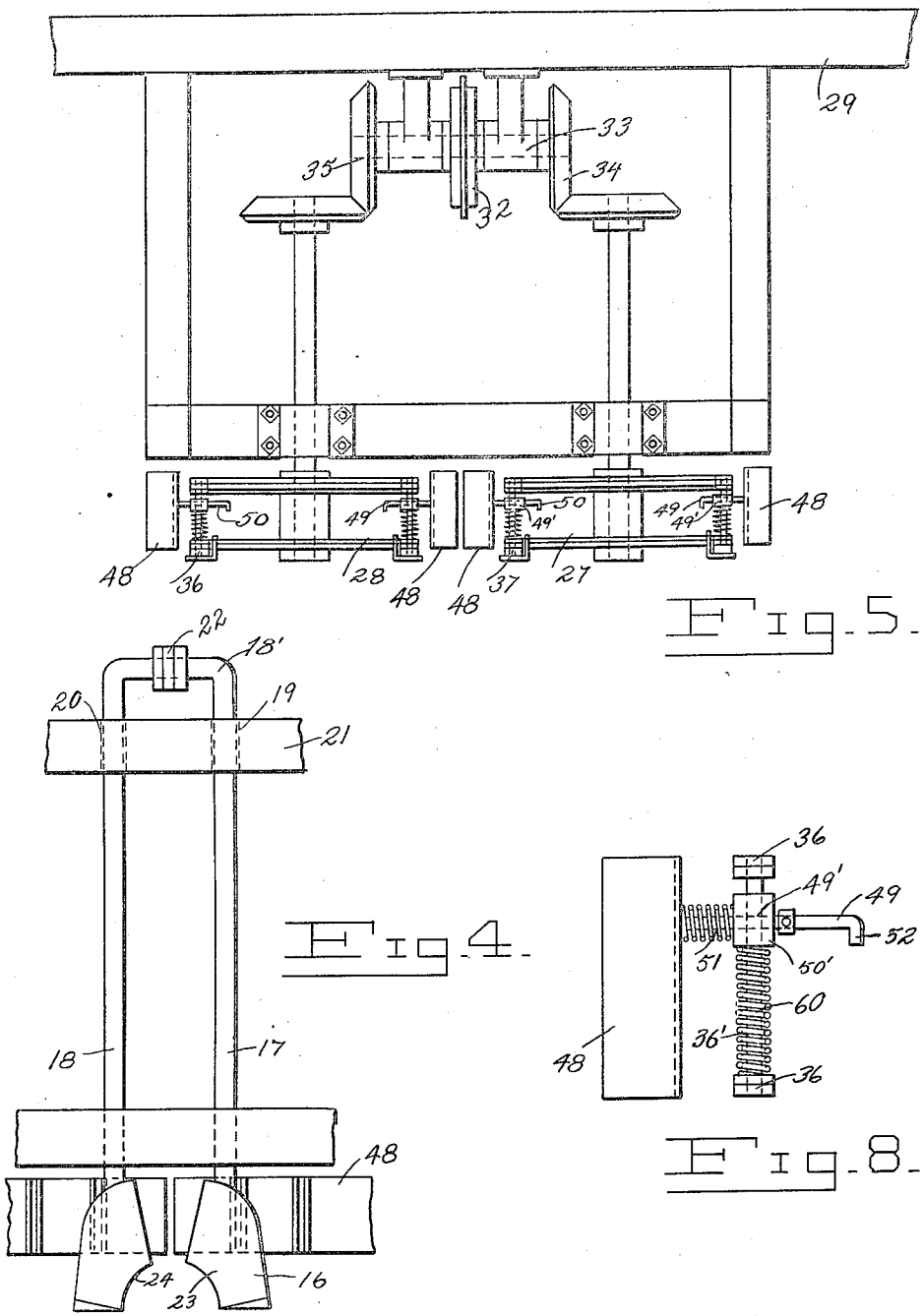

PETER PEDERSON AND GEORGE T. GILKERSON, OF WORKMAN, CALIFORNIA.

BEET PULLING AND TOPPING MACHINE.

1,140,847. Specification of Letters Patent. Patented May 25, 1915.

Application filed September 26, 1913. Serial No. 792,877.

*To all whom it may concern:*

Be it known that we, PETER PEDERSON and GEORGE T. GILKERSON, citizens of the United States, residing at Workman, in the county of Los Angeles and State of California, have invented a new and useful Beet Pulling and Topping Machine, of which the following is a specification.

Our invention relates to improvements in machines for pulling and topping beets, and the object of our invention is to provide a machine that will cut the coarse top of the beets in the ground, pull them from the ground, cut the rest of the top from them, and store the tops and beets in separate receptacles, all of which to be accomplished automatically while the machine is being driven through the field.

We attain this object by means of the mechanism illustrated in the accompanying drawings, in which—

Figure 1:
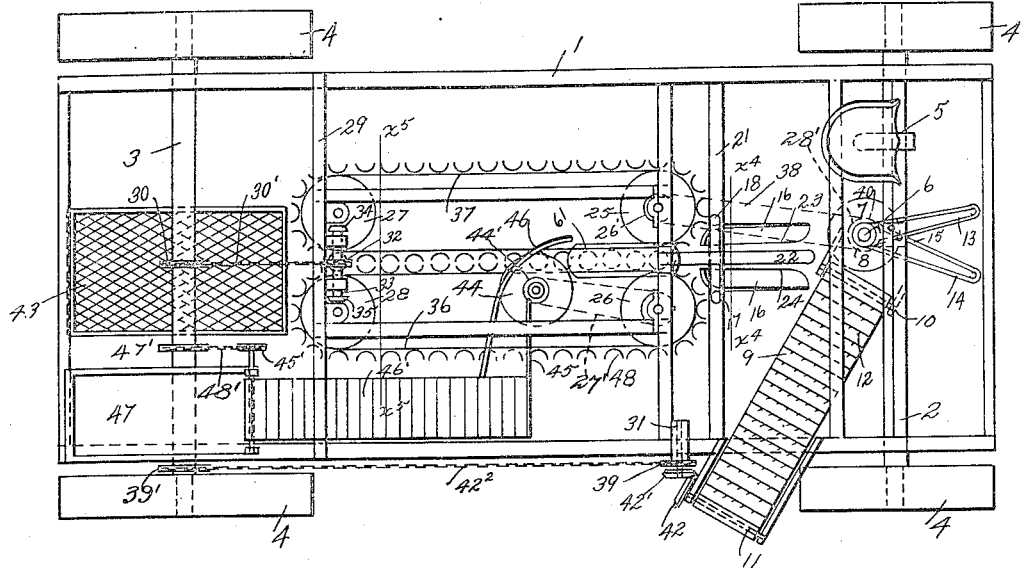
Figure 2:
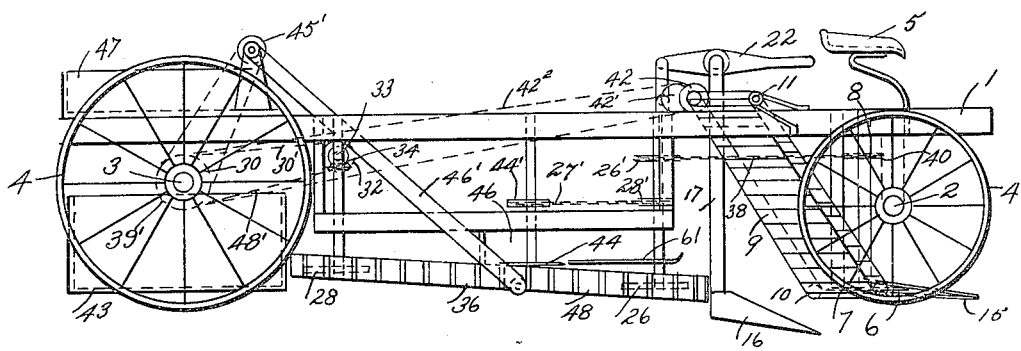
Figure 3:
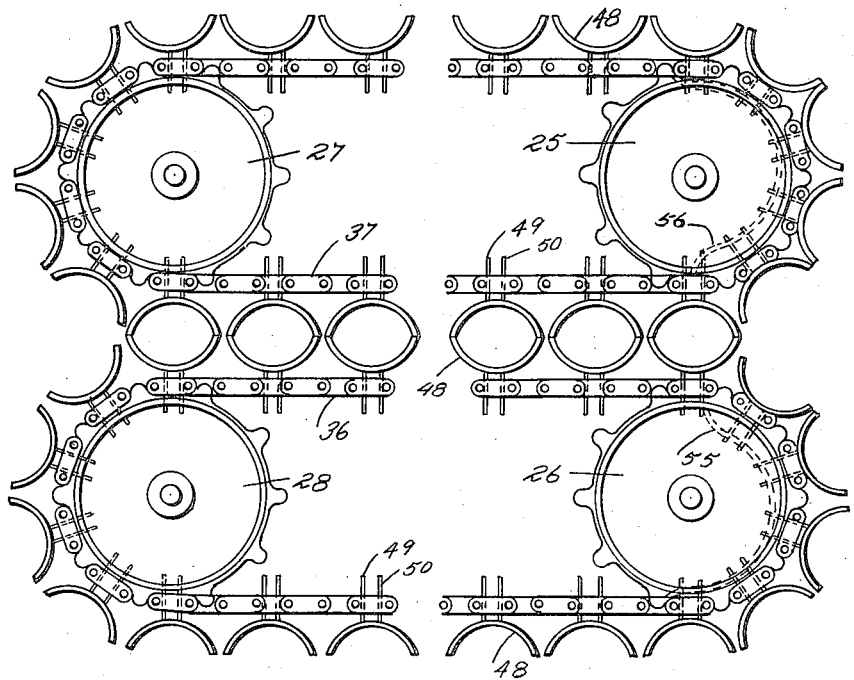
Figure 6:
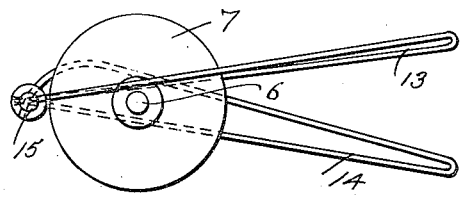
Figure 7:
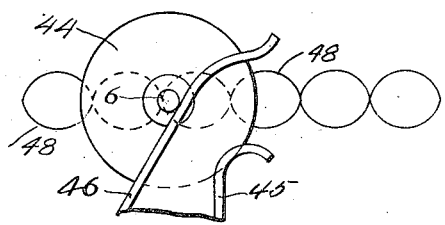

Figure 1 is a plan view of our device. Fig. 2 is a side elevation of the same. Fig. 3 is a plan view of the beet conveyer. Fig. 4 is a sectional view on the line $X^4$—$X^4$ Fig. 1. Fig. 5 is a sectional view on the line $X^5$—$X^5$ Fig. 1. Fig. 6 is an enlarged view in detail of the first top cutter. Fig. 7 is an enlarged view in detail of the second top cutter. Fig. 8 is an enlarged view of one of the grips.

Our device consists of the vehicle body or frame 1 on the axles 2 and 3 upon which are wheels 4. The seat 5 is secured on the frame and means for hitching a team of horses or a single horse may be attached to the front of the frame in a suitable manner.

Depending from the front end of the frame is the rough top cutter comprising the hanger 6 on which is pivoted the knife 7 having the sprocket 8 attached, and in an operative position to the knife 7 the endless conveyer 9 adapted to run on the rollers 10 and 11 and having the pins 12 to catch and hold the tops; this conveyer running from the knife 7 out to the edge of the frame where it dumps the rough tops on the ground; and the two wings 13 and 14 of the V-shaped guide 15 which is suspended near the ground and adapted to catch the beet tops, and by means of the overlapping of the wings turn the tops downward and present them thus to the knife 7. Back of this device is hung the bifurcated digger 16 on the vertical stems 17 and 18 which are adapted to slide in the holes 19 and 20 in the cross bars 21.

The stems 17 and 18 have a lateral cross connecting member 18' at the top and on this cross member is pivoted the handle 22, which is also pivoted at one end to a suitable cross member of the frame of the machine, and at the other end extends conveniently toward the seat 5 for operating the digger 16 which is secured to the bottom of the stems 17 and 18, and the digger may be raised or lowered as desired by the operator, the stems being vertically slidable in the cross member 21 of the frame. The shape of the diggers 16, and the space between the two members thereof adapt them to pass on each side of a row of beets and loosen them in the ground.

The laterally opposite sprockets 25 and 26 are revolubly mounted at the rear of the digger 16 on a suitable member of the frame, and considerably farther back, in a somewhat higher plane than, but in line with the sprockets 25 and 26 are revolubly mounted on the cross member 29, the similar sprockets 27 and 28. These latter sprockets are connected with and driven by the rear axle 3, by means of the sprocket 30 on the axle, the sprocket 32 on the transverse shaft 33 suitably journaled on the cross member 29, the bevel gears 34 and 35 adapted to connect the sprockets 27 and 28 with the shaft 33, and the sprocket chain 30' connecting the sprockets 30 and 32. The sprockets 25 and 27 and 26 and 28 are operably connected by means of the endless chains 37 and 36, respectively, and the knife 7 is operated by means of the chain 38 connecting the sprocket 40 on the hanger 6 with the sprocket 26' on the shaft of the sprocket 25.

The conveyer 9, which runs diagonally outwardly and upwardly from the knife 7 is operably connected to the machine by means of the bevel gear 42 on the shaft 11 of the conveyer adapted to mesh with a similar gear 42' on the shaft 31 which is revolubly mounted in the side member of the frame, and secured on this shaft 31 is the sprocket 39 carrying the chain 42² and connected by this chain with the sprocket 39' on the outer end of the rear axle 3, the lower end of the conveyer being provided with a shaft 10 similar to 11 upon which the conveyer is adapted to run.

At the rear of the machine, and pivotally suspended from the rear axle 3, is the beet box 43, and slightly forward of the center and to one side of the lateral center between the sprockets 25, 26 and 27, 28 the rotary knife 44 is pivoted suitably in the frame and is operably connected with the sprocket 26 by a chain 27' connecting the sprocket 28' with the sprocket 44' on the knife shaft. The knife guides 45 and 46 are positioned above the knife and are adapted to direct the tops which have been cut off to the conveyer 46' which is longitudinally positioned at one side of the machine and operated by the sprockets 45' and 47' and the chain 48' adapted to run thereon.

The outer surface of the endless belts 36 and 37 is provided with a plurality of curved grips, 48 secured thereto at regular intervals, and so positioned that the curves of the grips will be diametrically opposite on both of the belts, for gripping and holding the beets between the two opposite members and carrying them to the rear of the machine. The grips 48 are resiliently secured to the chains 36 and 37 by means of the lateral bolts 49 having the downwardly bent inner ends 52, and passing through the sockets 49' and carrying the springs 51 adapted to compress between the socket 49' and the grips 48 and the vertical bolts 36' secured to the chains 36 and 37, passing through the sockets 49' and carrying the springs 60 adapted to compress between the sockets 49' and the chains 36 and 37; thus a lateral and vertical resilient movement is afforded the grips on the chains. The chains 36 and 37 are mounted in pairs and the mountings of the grips are positioned between and secured to the two members of the pair. The cams 55 and 56 are formed of flat bars, bent into their proper shape and adapted to engage the bent ends 52 of the bolts 49 on the grips 48 as the latter move inwardly at the front end, so as to enlarge the space between the opposite grips on the two chains and permit the beets to be gathered up between the grips.

In operation, as the vehicle is driven along a row of beets in the field, the digger 16 is lowered so as to loosen the beets in the ground; as the vehicle moves, the tops of the beets are forced between the wings 13 and 14 and the tops are cut off by the first knife 7, and as the beets are raised up on the inclined edges of the digger they are grasped by the grips 48, which have been held apart to receive them by means of the cams 55 and 56, and when released from the cams they adapt themselves to the size of the beets by the resiliency of the springs 51, and are carried up between the two endless chains 36 and 37. The guide rod 61 extends upward and backward from the frame over the knife 44, presses the beets down to a common level, and as a beet passes the knife 44, the top is cut off clean, passes between the guides 45 and 46 and is directed on to the conveyer 46' and from there into the top box 47, located at the rear of the conveyer and secured to the frame; the topped beet, in the meantime passing into the beet box 43 below the rear axle, which box has an inclined wire bottom and may be provided with suitable means for dumping the contents at stated intervals.

We are aware that beet diggers, conveyers and topping machines are not new, and it is not our intention to claim invention thereon, but we are not aware that the gripping and cutting means herein set forth have ever been used or known and we desire to claim broadly thereon, the same being adapted for use in connection with any conveying or digging mechanism, the form herein shown and described being commonly used in the industry.

Having thus described our invention, what we claim as new and desire Letters Patent for, is:

1. In a machine of the character described, the combination with a running gear frame and rotary topping means mounted thereon, of a pair of oppositely mounted chains having a plurality of resilient gripping members mounted thereon adapted to grip and convey the beets through said machine and by said topping means; and means for causing the separation of said gripping members at the front of said machine to permit the entrance of the beets therebetween, as and for the purpose specified.

2. In a machine of the character described, the combination with a running gear frame and rotary topping means mounted thereon, of a pair of oppositely mounted chains having a plurality of resilient gripping members mounted thereon, movable lengthwise through the center of said machine and adapted to grip and convey the beets by said topping means; means for causing the separation of said gripping members at the front of said machine to permit the entrance of the beets therebetween; and means for operably connecting said topping means and said gripping means with said running gear, for the purpose specified.

3. In a machine of the character described, the combination with a running gear frame, a preliminary rotary, horizontally disposed topping means at the front of and mounted upon said running gear, and a primary, rotary, horizontally disposed topping means toward the rear of and mounted upon said running gear; of a pair of coöperating, oppositely mounted, chains movable lengthwise of and substantially in the center of said running gear and having a plurality of resilient gripping members mounted thereon; and means for constantly causing the separation of said gripping members at the front of said machine to permit the entrance of the beets therebetween, for the purpose specified.

4. In a machine of the character described, the combination with a running gear, a horizontally disposed, rotary topping means at the front of said machine and a horizontally disposed rotary topping means at the rear thereof; of a pair of oppositely mounted chains on said running gear; a plurality of semi-circular gripping members resiliently mounted on said chains for gripping and conveying the beets through said machine and by said cutting means; means for causing the separation of said gripping members at the front of said machine to permit the entrance of the beets therebetween; and means for operably connecting said topping means and said gripping means with the running gear of said machine, for the purpose specified.

PETER PEDERSON.
GEORGE T. GILKERSON.

Witnesses:
J. E. BOOKSTÖVER,
M. E. KINNEY.